United States Patent [19]

Hamar

[11] 4,045,129

[45] Aug. 30, 1977

[54] APPARATUS FOR HARD MOUNTING AN OPTICAL MEMBER TO A RIGID BASE

[76] Inventor: Martin R. Hamar, P.O. Box 31, Wilton, Conn. 06897

[21] Appl. No.: 638,506

[22] Filed: Dec. 8, 1975

[51] Int. Cl.² ............................................. G02B 7/00
[52] U.S. Cl. .............................. 350/321; 331/94.5 D; 350/252; 350/287; 356/112
[58] Field of Search .................. 356/138, 153, 172; 331/94.5; 350/252, 253, 287, 319, 321; 250/239

[56] References Cited

U.S. PATENT DOCUMENTS

| | | | |
|---|---|---|---|
| 2,404,385 | 9/1942 | Fritts | 350/287 |
| 2,426,521 | 3/1946 | Parker | 350/252 |
| 3,387,531 | 6/1968 | Hesse | 356/112 |
| 3,428,915 | 2/1969 | Leone et al. | 350/252 |

FOREIGN PATENT DOCUMENTS

517,086  10/1955  Canada ................................. 350/253

*Primary Examiner*—John K. Corbin
*Assistant Examiner*—B. Wm. de los Reyes
*Attorney, Agent, or Firm*—Anthony J. Casella; Joseph A. Calvaruso

[57] ABSTRACT

The present invention relates to an apparatus in the form of a holder for hard mounting an optical member to a rigid base in order to maintain the relative spatial alignment of the assembly in the presence of differential thermal expansion of the elements of the assembly. The apparatus or holder comprises a tubular member terminating at one end with a base for attachment to the mounting structure for the assembly, while at its opposite end the holder has flange portions for engaging the optical member. The longitudinally extending portion of the holder comprises thin wall, spring finger members which are disposed to establish bilateral symmetry in a plane perpendicular to the longitudinal axis of the holder, which bilateral symmetry assures the maintenance of the spatial alignment of the members of the assembly. The optical member is hard mounted to the flange of the assembly by a suitable rigid epoxy. The hard mounting of the optical apparatus assures that there is no relative movement between the spring fingers and the optical member. The spring fingers, however, allow for differential expansion between the optical element and the base of the mount.

2 Claims, 7 Drawing Figures

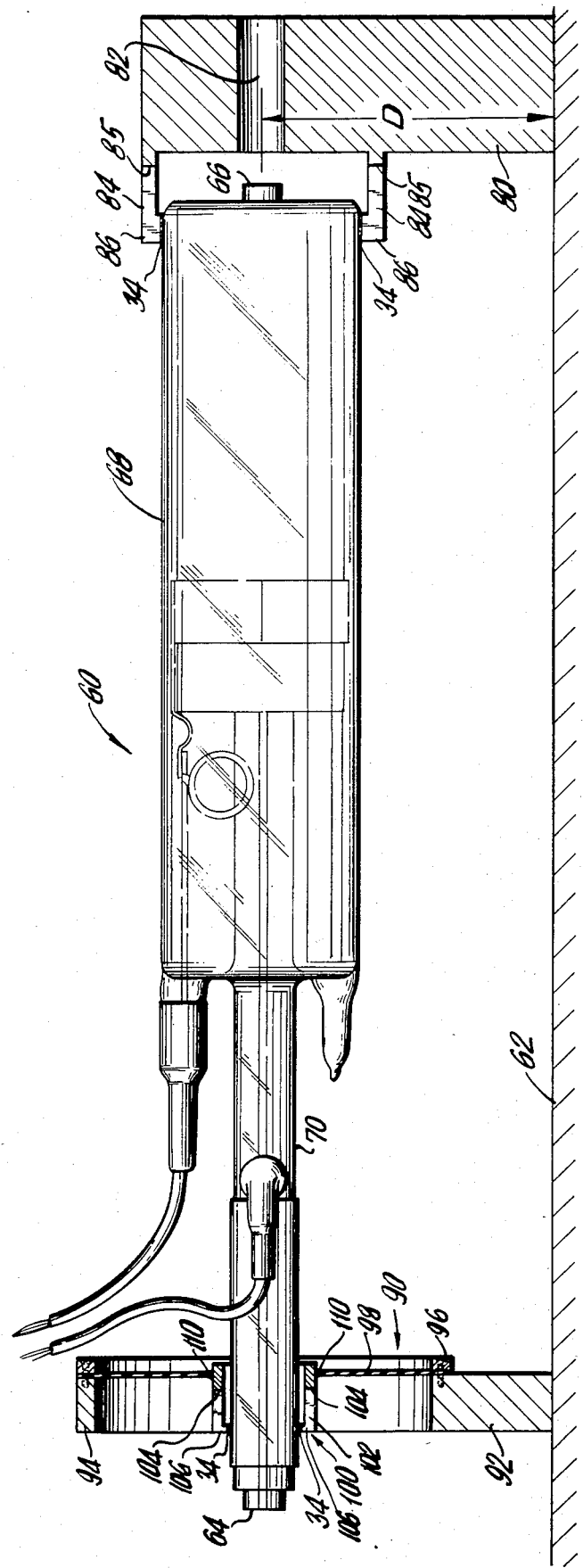

APPARATUS FOR HARD MOUNTING AN OPTICAL MEMBER TO A RIGID BASE

DESCRIPTION OF THE INVENTION

The present invention relates to a new and improved apparatus for hard mounting an optical member to a rigid base, and has particular application in the hard mounting of a laser tube as employed in precision alignment equipment.

The essence of the subject invention is a novel means for mounting optics in a holder in a way that will either allow for the differential expansion between the optical materia (such as glass) and the material of the mounting structure (which may be metallic such as aluminum) with changes in temperature; and also allow for the differences in expansion rate; but at the same time will cause minimal stress in the optical member itself, and most importantly, will not allow the optical member to move in a spacial sense. In other words, the new and improved mounting device of the subject invention, when fully assembled and hard mounted to an optical instrument, will insure that differential thermal expansion or contraction of the elements of the assembly will not introduce any stresses in the optical part, or cause any tilting or translational movement of the optical part as a result of temperature change and differential expansion.

Heretofore, it has been axiomatic in the optical industry that the mounting of precision mirrors or lenses required the use of a three-point support, and in order to maintain the optical member on said three-point support, only a very light spring pressure should be employed. If adhesive was employed, the adhesive was of a nature that never fully sets, but remains sufficiently flexible to allow relative movement between the optical part and its associated holder. In fact, in the art of mounting high quality optical instruments, the use of any adhesive compound in the mounting of the optical instruments is discouraged. When any adhesive is employed, such as in known systems for mounting laser tubes, it is generally recommended that only a flexible adhesive, such as a silicone rubber compound, be employed in order to allow for expansion and relative movement between the glass of the tube and the metallic mounting structure. Not only radial expansion, but axial expansion, is encouraged through the use of such flexible adhesive mounting compounds. It should be noted that in the mounting of a glass laser tube onto an aluminum mounting structure, the rate of expansion of aluminum is approximately six times greater than the rate of thermal expansion of the glass. Hence, heretofore, it has been the accepted theory of the industry to employ only relatively flexible adhesive material in order to allow the relative movement of the glass tube to be aluminum mounting structure. By this relative movement, it was assumed that this procedure made it possible to prevent the application of thermal stress from being imparted to the glass tube by the expansion of the aluminum mounting structure.

With the above mentioned restrictions employed by the art in the mounting of optical instruments, it has been found that deviations in the spatial alignment of the optical instruments occur when the mounting assemblies for the optical instruments are subjected to temperature variation, shocks, and vibrations. Although, in many applications, such deviations are well within the tolerances acceptable for the particular application, with the development of new and sophisticated optical equipment, it has been found that such tolerances are too great for certain applications. As an example, in the alignment to turbogenerators, and in particular the bearings for such turbogenerators which may be on the order of five feet in diameter, and are spaced at a distance of up to 150 to 200 feet, it has been found that the desirable tolerance for the centering of the bearings is on the order of 1/1,000 of an inch. Keeping this allowable tolerance in mind, it should be noted the job site on which the turbogenerators are placed may have temperature variations as much as 40° F, and although a tolerance of variation of the laser beam of the order of 1/1000 of an inch and angular deviation of 1 second of arc may be tolerated at the bearing locations, when these tolerances are translated back into the laser apparatus the tolerances are even more acute. More particularly, in the laser apparatus there is a telescope which expands the diameter of the beam and has a magnification of approximately 7, it is readily seen that the allowable deviation of the mirrors of the laser in the way of tilt or translation, are on the order of 1/7 of 1/1000 of an inch, and considering the fact that the laser tube contains two mirrors which are spaced, the relative allowable tilting of such mirrors translates into an allowable tolerance of millionths of an inch. As an example of the particular application in which a laser is employed in conjunction with turbogenerator equipment, reference is made to the inventor's prior application Ser. No. 405,523 filed Oct. 11, 1973 and entitled "System and Method for Aligning Apparatus Utilizing A Laser", now U.S. Pat. No. 3,902,810 issued Sept. 2, 1975.

Accordingly, it is an object of the subject invention to overcome the shortcomings of the prior art in providing a mounting device for electrical apparatus capable of maintaining the tolerances required for precision applications such as in the application of laser alignment systems for turbogenerator equipment, and which apparatus flies in the face of the prior art techniques in that it employs a hard mounting arrangement for the optical instruments. In summary, the subject invention relates to an apparatus for hard mounting an optical member to a rigid base so as to form an assembly that allows for differential thermal expansion of the elements of the assembly with minimum stresses being introduced into the optical member, and at the same time maintaining the relative spatial alignment of the assembly. The apparatus comprises an elongated hollow member having bilateral symmetry in a plane perpendicular to the longitudinal axis of the member, with the member comprising an array of elongated flexible spring fingers terminating at one end in a flange which is adhesively connected to the optical instrument in a hard mounted connection, while the opposite ends of said spring fingers terminate in a base which, in turn, is adapted to be connected to the rigid base of the assembly. The flexibility of the intermediate spring fingers, and the bilateral symmetry thereof, assures that thermal expansion and the accompanying stresses are compensated for within the spring fingers, rather than being introduced into the optical member, thereby preventing spatial displacement thereof. A typical apparatus comprises a generally cylindrical member made of a flexible metallic material such as aluminum, with the spring fingers being on the order of from 5/1000 to 30/1000 of an inch, and terminating at one end with a base which may be provided with an aperture to allow the laser beam to pass therethrough.

Further objects and advantages of the subject invention will become more apparent from a reading of the following detailed description taken in conjunction with the accompanying drawings, in which:

FIG. 6 is a sectional view illustrating still another application of the mounting apparatus of the subject invention; and FIG. 7 is a side view, partially in section, of the mounting of a laser tube employing holding apparatus of the subject invention.

Figure 1:
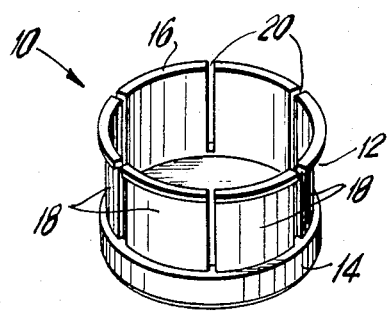
FIG. 1 is a perspective view of the optical holding apparatus of the subject invention.
Figure 2:
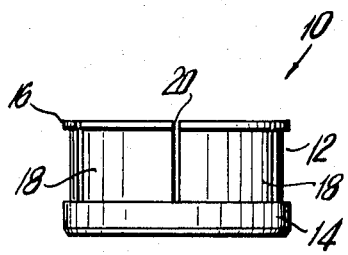
FIG. 2 is a front view of the apparatus of FIG. 1.

Turning to FIGS. 1 and 2, the optical holding apparatus or mounting device is designated by numeral 10 and includes an elongated hollow portion 12 terminating at one end at base 14, while the opposite end terminates at flange 16. The elongated hollow portion 12 may be formed of a plurality of longitudinally extending flexible walls 18 that are defined by longitudinally extending slits 20. The longitudinally extending flexible walls 18 are arranged in an array to form a thin wall cylindrical configuration, with the thicknesses of the flexible walls 18 being on the order of anywhere from 5/000 to 30/1000 of an inch. The number of slits 20 may vary from 4 to 24, or even greater, depending on the needs of the particular mounting device. The construction of the mounting device 10 provides the separate, relatively flexible fingers or flexible walls 18 which, by being mounted in a symmetrical array provide the required geometric configuration to achieve bilateral symmetry in a plane perpendicular to the longitudinal axis of the device 10. Bilateral symmetry of subject device is provided for minimizing tilting or translational movement of the optical part mounted on the device 10, as more fully described hereinafter. As shown in FIG. 2, the flange 16 is relatively small, and is primarily provided to achieve a stable seat on which the optical member may be rigidly bonded. Preferably the mounting device 10 is of unitary construction, and made of a lightweight metallic material, such as aluminum, although a flexible plastic may also be employed for the construction of the mounting device 10. Theoretically it is possible to employ any geometric shape in the configuration of the mounting device, as long the bilateral symmetry is achieved. Hence the array of flexible fingers or flexible walls 18 may be configured in a triangular, rectangular, square, penthagonal, or almost any shape that has some degree of bilateral symmetry.

Figure 3:
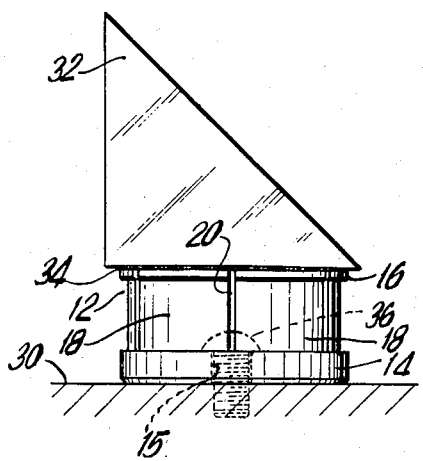
FIG. 3 is a front view of the subject apparatus employed in connection with an optical member and a rigid base.
Figure 4:
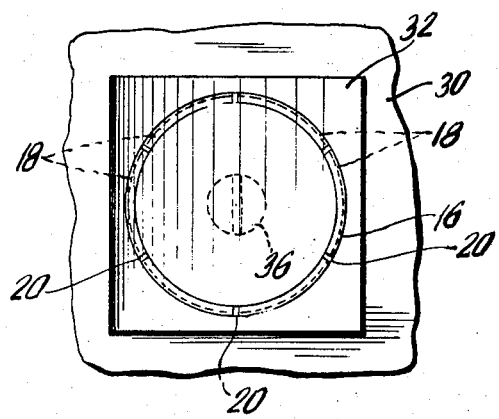
FIG. 4 is a plan view of the assembly as shown in FIG. 3.
Figure 5:
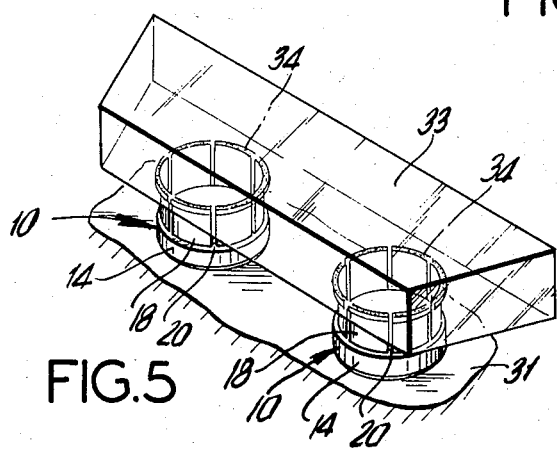
FIG. 5 is a perspective view of another application of the mounting apparatus of the subject invention.

FIGS. 3 and 4 illustrate a typical prism mounting employing the subject mounting device 10. The latter may be constructed to include an aperture 15 in the base 14, in order to enable the mouting device to be screw-mounted, by means of screw 36, to the rigid support base 30. Alternatively, the mounting device may be adhesively bonded, or other conventional fastening means may be employed to rigidly secure the device 10 to the support base 30. The prism or optical member 32 is hard mounted to the flange 16 of the device 10 by means of a rigid bonding agent 34, such as a commercially available rigid epoxy. Assuming that the support base 30 is made of aluminum, it is noted that the support 30 has a higher coefficient of thermal expansion, than the glass optical member 32. In fact, the difference between the thermal coefficients of expansion is on the order of 6X. Thus, with the mounting device 10 made of an aluminum material, it is seen that when exposed to a thermal gradient, the expansion of the optical member 32 in the plane perpendicular to the longitudinal axis of the mounting device 10 is only 1/6 of the expansion of the support base 30. In order to prevent the introduction of thermal stresses into the optical member 32, which may give rise to tilting or translation thereof, the plurality of longitudinally extending flexible walls 18 or fingers operate to flex along their length thereby compensating for the differential thermal expansion between the base 30 and the optical member 32. Still further, because of the hard mounting of the optical member 32 to the mounting device 10, there is no relative movement between the optical member and the mounting device, with all of the movement or compensation for the differential thermal expansion being achieved by virtue of the array of bilaterally symmetrical flexible fingers 18. It is noted that by since the optical member 32 is rigidly attached or hard-mounted to the flexible fingers 18, this may tend to introduce a slight residual stress into the optical member 32, however the basic objective of the thin flexible fingers 18 is to reduce the magnitude of that stress to such a low level that, in effect, it does not make any difference to the optical member 32. In other words, the optical member 32 is fairly rigid to begin with, and if a very light stress is imparted to it, the optical member is not going to distort nor will its optical qualities be affected to any appreciable degree. At the same time, the subject invention has accomplished the primary objective of hard-mounting the optical member so that there is no movement of the optical member relative to the support base 30. Thus the mounting arrangement achieves the desired spatial stability required in precision optical devices. As indicated above, the primary objective is to prevent tilting or translation of the optical member 32 when subjected to thermal variations, as well as to shock and vibrations, and this is accomplished by means of the mounting device 10 that has the array of symmetrically arranged flexible walls 18. FIG. 5 illustrates the use of a plurality of mounting devices 10 for mounting an enlarged optical member 33, and in this arrangement, each mounting device 10 is rigidly connected to the support base 31, and is likewise hard-mounted as at 34 to the optical member 33. Because of the spacing of the mounting devices 10 there is no interaction between such mounting devices which may give rise to the introduction of residual stresses into the optical member 33.

FIG. 6 illustrates still another embodiment of the subject mounting device, and in particular a mounting device for mounting a lens 40. Mounting device 50 includes a plurality of longitudinally extending flexible walls or fingers 52 that are spaced by means of slits 53, which are similar to the embodiment illustrated in FIGS. 1 and 2. The base 54 of device 50 includes a central aperture 56 to enable the passage therethrough of the light beam, while the opposite ends of the spring fingers 52 accommodate the hard-mounting thereon of the lens 40. The adhesive material, such as rigid epoxy is designated by the numeral 34. As illustrated in FIG. 6, the upper ends of the fingers 52 grip the periphery of the lens 40, and the adhesive material 34 insures the hard-mounting of the lens 40 to the device 50.

One application of the subject invention is in conjunction of the mounting of a laser tube, as illustrated in FIG. 7. The laser tube 60 may be employed in conjunction with a laser alignment apparatus as discussed in applicant's prior invention, now U.S. Pat. No. 3,902,810, and it is noted that the primary concern in the mounting of the laser tube 60 is to compensate for thermal expansion, and shocks and vibrational forces that are developed in the base 62 on which the laser tube is mounted. In the mounting of the laser tube 60, it is important that the mounting apparatus compensate for radial differential expansion between the mounting structure and the glass tube 60, as well as axial differential movement, so as to maintain the spatial positioning of the laser tube 60. Otherwise, the tube will be distorted and bent, and even the slightest bending of the tube will result in movement of the laser beam either in translation or in angular displacement, neither of which can be tolerated in the laser instrument for the precision alignment applications mentioned above. In addition, it should be noted that the mounting of the laser tube must insure the spatial stability of the tube because any tilting of the rear mirror 64 of the laser tube relative to the front mirror 66 of the laser tube will result in either a translational shift or angular shift in the beam, which again cannot be tolerated. Generally, the laser tube is built in a shop where the average temperature is on the order of 70° F, while the instrument is intended to be employed at a job site where the temperature range may be from 30° F to over 100° F. Thus, it is most important to maintain the spatial relationship of the tube relative to its mounting structure 62, and to insure no bending or distortion of the tube along its length which will give rise to misalignment between its front and rear mirror 64, 66.

Referring now to FIG. 7, the laser tube 60 includes a cathode bulb 68 at the end of which the mirror 66 is disposed, and a capillary 70, at the opposite end of which the mirror 64 is disposed. The capillary is a thick walled tube having a small hole down the longitudinal center thereof where the lasing action takes place. The mirrors 64 and 66 are aligned to form the resonate cavity of the laser tube 60.

The end of the cathode bulb 68 is mounted by means of an embodiment of the subject invention comprising a mounting block 80 which is rigidly connected to the supporting base 62 by suitable fastening means, either in the form of nuts and bolts that may be spring biased, or suitable adhesive. The mounting block 80 includes an aperture 82 to allow the passage therethrough of the laser beam. Extending from the mounting block, and preferably integral therewith are a plurality of flexible walls or fingers 84, that are separated by slits 85 in a similar construction to the subject device as illustrated in FIG. 1. The flexible fingers 84 are unitary with the mounting block 80 in order to minimize the number of interfaces between the members of the mounting structure. Disposed at the opposite end of the flexible fingers 84 are flanges 86 adapted to engage the cathode bulb 68. Suitable rigid epoxy material 34 is provided for hard-mounting the spring fingers 84 to the cathode bulb 68. Because of the bilateral symmetry of the array of flexible fingers 84, as well as the hard-mounting of the cathode bulb to the flexible fingers 84, the cathode bulb is maintained in spatial relative position even when subjected to thermal expansion, or shock and vibrational forces. In particular, any differential expansion between the glass of the laser tube and the conventional metallic material of the mounting structure 62 is compensated for by flexing of the spring fingers 84 in the radial plane extending from the axis of the laser beam. In other words, the mounting structure of the subject arrangement assures that the center line of the laser beam will remain a constant distance above the base casting 62, which distance is indicated by the designation "D".

In order to maintain the spatial relationship of the capillary 70 of the laser tube 60, and also to accommodate elongation of the laser tube along its longitudinal axis, the mounting apparatus of the subject invention for mounting the capillary is supported by means of a conventional diaphragm assembly, as illustrated in FIG. 7. More particularly, the diaphragm assembly is designated by the numeral 90 and includes a base structure 92 and is rigidly secured to the base 62 by conventional means, with the base structure 92 including a mounting block 94, a diaphragm clamp ring 96, and a flexible diaphragm 98 accommodated and rigidly held between the clamp ring 96 and the mounting block portion 94. Preferably the mounting block and the ring are made of aluminum, while diaphragm 98 maybe made of aluminum or brass in the range of 4/1000 to 20/1000 inches in thickness in order to provide the necessary flexibility for thermal expansion and contraction of the laser tube along its longitudinal axis. The diaphragm 98 has a central aperture of the same diameter of the subject mounting device, designated by numeral 100 in FIG. 7. Mounting device 100 is generally similar to the embodiment illustrated in FIGS. 1 and 2, except that the base portion is apertured to enable the capillary to extend longitudinally through the device 100. The latter includes a plurality of longitudinally extending flexible walls or fingers 102 that are arranged in an array to achieve bilateral symmetry, and are spaced by means of longitudinally extending slits 104. At one end of the flexible walls 102 there is provided inwardly directed flanges 106 that engage the capillary 70. The latter is hard-mounted to the flanges 106 by means of a suitable rigid epoxy, designated by the numeral 34. The opposite end of the mounting device 100 is secured to the diaphragm 98 by cementing designated by the numeral 110. The diaphragm is operative to prevent radial motion of the laser tube, yet flexible enough to enable the laser tube to expand and contract along its longitudinal axis in response to thermal variation of the environment.

The composite mounting arrangement of the laser tube 60, as hard mounted at the cathode bulb and the capillary, and employing the subject invention is operative to maintain the laser tube in a fixed spatial relationship relative to the support base 62, even in the presence of thermal variations, shock, and vibrations. Differential expansion of the elements is compensated for by deflection of the flexible fingers 84 and 102, without imparting stresses onto the glass of the laser tube 60.

By the mounting arrangement as illustrated in FIG. 7, there is provided an arrangement for insuring the spatial stability of the laser beam in the presence of thermal expansion and contraction, vibration, and shock, so as to enable the laser to be employed in conjunction with precision alignment equipment requiring very stringent tolerances.

Although the subject invention has been described as employing a non-flexible adhesive for mounting the optical device to the subject apparatus, for certain applications, and in particular where the flexible fingers completely surround the optical member (as in the embodiment illustrated in FIG. 7), it may be possible to employ a flexible adhesive since the flexing of the flexible fingers will compensate for differential thermal expansion of the elements with little or no relative movement occurring in the flexible adhesive.

The subject invention is capable of numerous forms of various applications without departing from the essential features herein disclosed. It is therefor intended and desired that the embodiments herein shall be deemed merely illustrative and not restrictive and that the patent shall cover all patentable novelty herein set forth; reference being had to the following claims rather than to the specific description herein to indicate the scope of the invention.

What is claimed is:

1. Apparatus for hard mounting an elongated laser tube to a rigid base structure comprising:
an elongated hollow member having bilateral symmetry in a plane perpendicular to the longitudinal axis thereof, which member terminates at one end with a base that is flexibly connected to said rigid base by means of a diaphragm assembly, said base having an aperture therethrough which is of greater diameter then the diameter of said laser tube whereby said base is concentric with said laser tube, the opposite end of said member engaging the laser tube and rigidly bonded thereto, said hollow member including a longitudinally-extending flexible wall having longitudinally-extending slits extending from said opposite end to points intermediate the length of the hollow member so as to define flexible spring fingers whereby when the base of the hollow member is secured to the rigid base at one end, it is concentric with a laser tube, and bonded to the laser tube at the opposite ends of said flexible fingers thereby providing an assembly that allows for differential thermal expansion of the elements of the assembly with minimum stresses being introduced into the laser tube while maintaining relative spacial alignment of the assembly.

2. Apparatus for hard mounting a laser tube to a rigid base as in claim 1 wherein said member is bonded to the laser tube by a non-flexible adhesive.

* * * * *